United States Patent Office 2,703,154
Patented Mar. 1, 1955

2,703,154

CONCENTRATION OF ACETYLENE

Morris Levine, Long Beach, Calif., and Robert M. Isham, Okmulgee, Okla., assignors to Southern Production Co., Inc., Shreveport, La., a corporation of Delaware No Drawing. Original application October 19, 1945, Serial No. 623,452. Divided and this application August 18, 1952, Serial No. 305,078

1 Claim. (Cl. 183—115)

This invention relates to a method of separating acetylene from its mixture with other gases.

This is a division of application Ser. No. 623,452 filed October 19, 1945, now Patent Number 2,623,611, issued December 30, 1952.

As is known, acetylene may be produced from non-acetylenic hydrocarbons, particularly gaseous hydrocarbons, by a number of different methods. Among such methods are: the treatment of hydrocarbons of the methane and ethylene series by regulated pyrolysis; the passage of such hydrocarbons through an electric arc, and incomplete combustion of such hydrocarbons as, for example, in the manner disclosed in U. S. Patent 2,466,617.

In all such methods the reaction product is a complex gaseous mixture containing but a relatively small percentage of acetylene. Depending upon the particular process employed such gaseous reaction products contain carbon dioxide, carbon monoxide, hydrogen, nitrogen, unconverted hydrocarbons, ethylene and the like. The reaction mixture may also contain benzene, naphthalene and other aromatic hydrocarbons as well as some carbon black.

In order to commercially utilize the acetylene or to convert it into other valuable and useful products it is desirable to treat such gases to concentrate and/or separate the acetylene. Such concentration may be effected by contacting the acetylene-containing gases with a solvent which is highly selective for acetylene, separating the undissolved gases and thereafter separating the dissolved gases from the extracting solution by heating and/or reducing the pressure of the solution. For such acetylene concentration or separation, various solvents have been proposed in the past, such as; esters of polyhydric alcohols, esters of polybasic organic acids, polyketones, aliphatic lactones and the like.

As will be appreciated, a solvent to be satisfactory for the described concentration and/or separation of acetylene from such heterogeneous gaseous mixtures, should possess a number of desirable characteristics. Such solvents should have a high solvent power for acetylene and conversely a low or negligible solvent power for accompanying gases; in other words, the solvent should be highly selective to acetylene as well as possessing a good solvent capacity therefor. Such selectivity, as is understood in the art, essentially determines the number of absorption steps or cycles which are necessary to secure an acetylene fraction of a predetermined concentration from lean acetylene-containing gas mixtures. A desirable effective solvent should also be characterized by a low vapor pressure at ordinary temperatures so as to minimize vaporization losses of the solvent. The solvent likewise should not be thermolabile and should be chemically stable under the temperature and pressure conditions of extraction and solvent recovery.

As a result of extensive experimentation in this field it has now been discovered that certain oxygenated derivatives of the relatively low atomic weight elements of group V of the periodic table are unexpectedly and peculiarly efficacious as selective solvents for acetylene and abundantly satisfy the requirements previously set forth. More particularly it has been ascertained that derivatives of the oxy-acids of phosphorus such as amides and mixed ester amides are especially valuable for this purpose. Similarly, analogous derivatives of oxyacids of nitrogen such as nitrosyl amines function excellently.

The efficacy of the described group of compounds for the purposes of the invention can readily be appreciated from a consideration of the data in Table I which shows the high solubility of acetylene, at the stated temperature, in a number of compounds of the group described.

Table I

| Solvent | Formula | Temp. °C. | Volumes acetylene dissolved by one volume solvent |
|---|---|---|---|
| Diethyl phosphate mono diethyl amide. | $O=P(OC_2H_5)_2N(C_2H_5)_2$ | 35 | 20.71 |
| Diethyl phosphate mono dimethyl amide. | $O=P(OC_2H_5)_2 N(CH_3)_2$ | 35 | 24.93 |
| Phosphoryl tri-dimethyl amide. | $O=P N(CH_3)_2 _3$ | 30 | 46.89 |
| Nitrosyl dimethylamine | $O=N-N(CH_3)_2$ | 30 | 14.59 |

As noted previously, a desideratum for this class of solvents is a low solubility for the components of the gaseous mixture other than acetylene. The compounds of the type described present just such desirable low solubility as is shown in Table II in which a typical derivative of oxy-acids of phosphorus, namely, phosphoryl-tri-dimethyl amide is the illustrative example.

Table II

| Gas | Volumes dissolved by 1 vol. phosphoryl tri-dimethyl amide at 30° C. |
|---|---|
| Ethylene | 2.16 |
| Carbon Dioxide | 3.80 |
| Methane | 0.30 |
| Carbon Monoxide | 0.14 |
| Hydrogen | 0.00 |
| Nitrogen | 0.04 |

It will be observed from the results depicted in the table that solvents of the class described are especially effective for the concentration of acetylene. They present very low or negligible solvent power for hydrogen, carbon monoxide and nitrogen. This is a particularly desirable feature because, as will be seen subsequently in Table III, these three gases are usually the preponderant constituents of the gaseous mixture. These solvents also have but low solvent power for methane and ethylene. As is apparent from Table I this group of solvents possesses high solvent power for acetylene and this coupled with their marked selectivity establishes them as excellent solvents for the described purposes.

The utility and efficacy of these materials as selective solvents for acetylene will be more readily appreciated from a consideration of typical examples of their use. A gas mixture was produced by partial combustion of methane (natural gas). The gaseous products were compressed to 250 p. s. i. and were subjected to a countercurrent scrubbing in a bubble tower with a stream of phosphoryl tri-dimethyl amide at atmospheric temperature. The undissolved gases were discharged from the top of the tower and the solvent, saturated with gaseous constituents, was withdrawn from the bottom. The solvent was stripped of the dissolved gases by reducing the pressure and heating the solvent and the evolved gases analyzed. The results of such treatment, illustrating the striking enrichment of the gas in acetylene, are shown in Table III in which the composition of the original gas and the gas mixture evolved from the solvent are directly compared.

Table III

| Constituent | Original gas mixture, percent | Enriched gas from phosphoryl tri-di-methyl amide, percent |
|---|---|---|
| Acetylene | 3.50 | 92.00 |
| Ethylene | 0.42 | 0.51 |
| Carbon dioxide | 2.12 | 4.42 |
| Methane | 7.66 | 1.19 |
| Carbon monoxide | 10.50 | 0.82 |
| Hydrogen | 28.50 | |
| Nitrogen | 47.30 | 1.06 |

The concentrations of acetylene can be further increased by treatment of the preliminarily concentrated gas mixtures tabulated in Table III with selective solvents for carbon dioxide. For example, the gas mixture produced by treatment with phosphoric-tri-dimethyl amide was scrubbed through mono-ethanol amine for selective extraction of the carbon dioxide and yielded a product containing 96% acetylene. As will be appreciated, this is sufficiently pure for most commercial purposes.

To determine still further the utility of the improved class of solvents for producing high concentration of acetylene the enriched gas mixture obtained in Example III by extraction with phosphoryl-tri-dimethyl amide was retreated by countercurrent extraction with this solvent. It was determined that with such a retreatment a gas mixture was produced which contained 97.7% of acetylene and 1.75% of carbon dioxide. As will be appreciated, such a gas mixture may be further treated in any desired manner to remove the carbon dioxide. For example, the retreated gas mixture mentioned above, and containing 97.7% acetylene was scrubbed with mono-ethanol amine for removal of carbon dioxide as a result of which a purified gas containing over 99% acetylene was obtained.

It is particularly to be noted that the solvents of the novel group described herein are all characterized by a relatively low vapor pressure, at ordinary temperatures; for example, the vapor pressure of phosphoryl tri-di-methyl amide is but 2 mm. at 90° C. The great number of compounds of the group described distill at temperatures above 200° C. at atmospheric pressure without decomposition and thus possess the desired chemical stability for the described use.

Just as compounds containing the phosphoryl group have been shown to have great selectivity for acetylene, analogous compounds containing the nitrosyl group display similar properties. It is to be noted that these compounds are derivatives of elements of group V of the periodic table, with atomic weights of less than 35.

It will be observed that the utility of the invention is not restricted to the employment of the improved solvents for separating acetylene from gaseous mixtures thereof. The invention is available for any purpose in which it is desired to employ a solvent having either a high solvent power for acetylene or which is highly selective for acetylene. For example, solvents of the present invention may be used in lieu of acetone or similar solvent to obtain a high concentration of acetylene in acetylene cylinders.

In commercial operations in which acetylene-containing gases are to be treated to achieve an enrichment of acetylene the described solvent extraction with the preferred solvents may be utilized in conjunction with other separation methods adapted to concentrate or remove specific components of the gas being treated. For example, the present method of concentrating acetylene may be embodied in a continuous process of treating acetylene-containing gases produced by incomplete combustion of hydrocarbons such as is described in U. S. Patent 2,466,517.

The reaction gas produced in such process comprises a mixture of carbon monoxide, carbon dioxide, hydrogen, methane, ethylene, acetylene, carbon black, aromatics such as benzene and naphthalene. This gaseous mixture may be treated to remove the carbon black as for example, by passage through a filter of Cotrell precipitator.

The gas freed from entrained solids may then be passed to a scrubber and scrubbed therein under superatmospheric pressure with a selective solvent for the aromatics, as for example with a mixture of petroleum or coal tar hydrocarbons. This solvent effectively extracts benzene and naphthalene from the gas stream. This solvent may then be stripped of the aromatics and the denuded solvent recycled.

The gas, freed of aromatics, is then preferably compressed to the degree suitable for the particular solvent employed and the compressed gas is then contacted in a suitable tower or towers with one or the described solvents or suitable mixtures of such solvents. While compression of the gas prior to contact with the novel solvents is desirable it is not essential. The extraction with the novel solvents is preferably carried out countercurrently and continuously. The solvent with its preferentially or selectively dissolved acetylene accumulates in the base of the extraction column and may be passed continuously or intermittently to a stripping unit which is operated under those pressure and temperature conditions which conduce to separate the solvent from the dissolved acetylene and other gases. The stripped solvent may be recycled to the extraction column to contact additional quantities of gas. The components of the gaseous mixture which are not extracted by the solvent in the extraction column may be withdrawn therefrom and disposed of or treated in any desired manner.

The gases evolved from the solvent in the stripper may be again extracted with the same solvent or with another solvent of the novel group and such dissolved gases may be evolved from the solvent in the manner described. This enriched gas may be further concentrated by removing the residual carbon dioxide content as by treatment with a selective solvent for carbon dioxide. Obviously, if desired, the carbon dioxide stripping may be applied to the gas which is evolved from the first solvent stripping operation.

In some circumstances it may be desirable to remove the liquid solvent saturated with acetylene for direct technical or industrial use as, for example by charging it into pressure cylinders from which the dissolved acetylene may subsequently be evolved by releasing the pressure.

It will now be appreciated that the class of solvents described herein are of peculiar utility in this field. The high solvent power for acetylene is of special value since the reaction gases which are treated contain but a minor percentage of acetylene. Such high solvent power thus insures high extraction with relatively low rations of circulated solvent. Of equal importance is the strikingly high selectivity of this class of solvents. As will be observed, this selectivity is most marked as to those constituents of the gas, such as nitrogen, hydrogen and carbon dioxide which together constitute about three-quarters of the total volume of the lean gas.

While specific examples of the improved highly selective acetylene solvents have been described, it is to be understood that these are given to illustrate the value of the general group having the described desirable characteristics.

We claim:

In the concentration of acetylene from gaseous mixtures thereof the improvement which comprises contacting such mixtures with a solvent predominantly containing nitrosyl dimethylamine.

References Cited in the file of this patent

UNITED STATES PATENTS

| | | |
|---|---|---|
| 2,146,448 | Scott | Feb. 7, 1939 |
| 2,405,693 | Hamill et al. | Aug. 13, 1946 |
| 2,514,017 | Wachter et al. | July 4, 1950 |